United States Patent
Gettala et al.

(10) Patent No.: US 9,332,037 B2
(45) Date of Patent: May 3, 2016

(54) METHOD AND APPARATUS FOR REDUNDANT SIGNALING LINKS

(75) Inventors: Balachandar S. Gettala, Chennai (IN); Michael Jhu, Ottawa (CA); Michael Roberts, Kanata (CA); Henri R. Vandette, Kanata (CA); Glenn Arne Karlsen, Burnaby (CA); Jim Hurd, Ottawa (CA); Gerry Dubois, Richardson, TX (US); James A. Stanton, Jr., Allen, TX (US); Suryaram Alladi, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1770 days.

(21) Appl. No.: 10/397,959

(22) Filed: Mar. 26, 2003

(65) Prior Publication Data

US 2004/0042485 A1     Mar. 4, 2004

Related U.S. Application Data

(60) Provisional application No. 60/368,094, filed on Mar. 27, 2002.

(51) Int. Cl.
*H04L 29/06* (2006.01)
*H04L 29/08* (2006.01)
*H04L 12/70* (2013.01)

(52) U.S. Cl.
CPC ............ *H04L 65/1043* (2013.01); *H04L 29/06* (2013.01); *H04L 29/06027* (2013.01);
(Continued)

(58) Field of Classification Search
None
See application file for complete search history.

(56) References Cited

U.S. PATENT DOCUMENTS 4,071,908 A * 1/1978 Brophy et al. ................. 710/46
5,521,902 A * 5/1996 Ferguson ...................... 370/248
(Continued)

FOREIGN PATENT DOCUMENTS

| EP | 1 109 368 A2 | 6/2001 |
|---|---|---|
| EP | 1 109 368 A3 | 9/2002 |
| GB | 2 355 362 A | 10/1999 |

OTHER PUBLICATIONS

Postel, J., Request for Comments: 792 Internet Control Message Protocol, Sep. 1981.*
(Continued)

*Primary Examiner* — Hicham Foud
(74) *Attorney, Agent, or Firm* — Kramer & Amado, P.C.

(57) ABSTRACT

According to at least one embodiment of the invention, a protocol for managing redundant signaling links to form a reliable signaling connection is provided. The protocol has an initialization phase, in which the availability of signaling links is determined and an available signaling link is selected and activated, followed by an operational phase in which the activated link is used for sending signaling messages for a higher-level protocol. During the operational phase both links are monitored for availability using a query and reply technique. Should either link fail, a status message is sent to the remaining available link along with an activity switchover being performed, as required, depending on whether the failed link was the active link. The higher-level protocol process running on the media gateway performs management of the links, and the media gateway controller operates as a slave, whereby it need not initiate nor control any of the activities for management of the signaling links, thereby reducing the processing burden placed upon it. However, optionally, a media gateway controller may request a link switchover, which may be used to support link maintenance activities or link congestion avoidance measures.

38 Claims, 5 Drawing Sheets

(52) U.S. Cl.
CPC ............ *H04L67/1002* (2013.01); *H04L 67/14* (2013.01); *H04L 69/164* (2013.01); *H04L 69/14* (2013.01); *H04L 69/16* (2013.01); *H04L 69/329* (2013.01); *H04L 2012/5665* (2013.01); *H04L 2012/5671* (2013.01)

(56) References Cited

U.S. PATENT DOCUMENTS

| | | | | |
|---|---|---|---|---|
| 5,844,895 | A * | 12/1998 | Gradisching | 370/385 |
| 6,614,781 | B1 * | 9/2003 | Elliott et al. | 370/352 |
| 6,650,621 | B1 * | 11/2003 | Maki-Kullas | 370/238 |
| 6,674,713 | B1 * | 1/2004 | Berg et al. | 370/217 |
| 6,680,952 | B1 * | 1/2004 | Berg et al. | 370/467 |
| 6,707,820 | B1 * | 3/2004 | Arndt et al. | 370/395.2 |
| 6,738,343 | B1 * | 5/2004 | Shaffer et al. | 370/216 |
| 6,775,373 | B2 * | 8/2004 | Stoughton | 379/219 |
| 6,839,344 | B1 * | 1/2005 | Couillaud et al. | 370/353 |
| 6,859,614 | B1 * | 2/2005 | Cho | 386/124 |
| 6,882,653 | B1 * | 4/2005 | Kiuchi et al. | 370/401 |
| 6,992,974 | B1 * | 1/2006 | Tripathi | 370/216 |
| 7,007,092 | B2 * | 2/2006 | Peiffer | 709/227 |
| 7,023,794 | B2 * | 4/2006 | Khan et al. | 370/219 |
| 7,055,173 | B1 * | 5/2006 | Chaganty et al. | 726/11 |
| 7,065,041 | B2 * | 6/2006 | Sen | 370/227 |
| 7,103,002 | B2 * | 9/2006 | Bjelland et al. | 370/242 |
| 2001/0036173 | A1 * | 11/2001 | Shmulevich et al. | 370/352 |
| 2002/0009072 | A1 * | 1/2002 | Halme | 370/352 |
| 2002/0042828 | A1 * | 4/2002 | Peiffer | 709/227 |
| 2002/0141352 | A1 * | 10/2002 | Fangman et al. | 370/254 |
| 2002/0172188 | A1 * | 11/2002 | Wunsch | 370/351 |
| 2003/0145108 | A1 * | 7/2003 | Joseph et al. | 709/239 |
| 2005/0058061 | A1 * | 3/2005 | Shaffer et al. | 370/216 |
| 2005/0132062 | A1 * | 6/2005 | Halme | 709/227 |

OTHER PUBLICATIONS

Tom Taylor; Megaco/H.248: A New Standard for Media Gateway Control (article); Oct. 2000; pp. 124-132; IEEE Communications Magazine.

P. Sijben, et al.; Media Device Control Protocol (article);Feb. 9, 1999; Internet Engineering Task Force; Internet.

* cited by examiner

METHOD AND APPARATUS FOR REDUNDANT SIGNALING LINKS

CROSS-REFERENCE TO RELATED APPLICATIONS

Applicant hereby claims the benefit under 35 U.S.C. 119(e) of U.S. provisional application No. 60/368,094, filed Mar. 27, 2002, entitled "Method and Apparatus for Redundant Signaling Links."

FIELD OF THE DISCLOSURE

The present invention relates generally to communication technologies and more particularly to call signaling technologies.

BACKGROUND

Multimedia communications systems typically include several components, for example, terminals, gateways, gatekeepers, multipoint controllers, multipoint processors, and multipoint control units. For proper operation, various components need to communicate reliably with various other components. A link is typically provided between a media gateway (MG) and its media gateway controller (MGC), which may be referred to as a call server, to allow communication between the MG and the MGC. Such a link carries signaling messages, for example, H.248 signaling messages complying with International Telecommunication Union Telecommunication Standardization Sector/Internet Engineering Task Force (ITU-T/IETF) Recommendation H.248, between an H.248 call control process in the MG and a call control process in the MGC. Such a link is typically configured as internet protocol (IP) over an asynchronous transfer mode (ATM) connection, for example, an ATM permanent virtual connection (PVC) and/or soft permanent virtual connection (SPVC). The H.248 signaling includes messages that are transported via the user datagram protocol (UDP). Each link is terminated at one end by a logical link termination in the MG and at the other end by an ATM network interface card installed in a signaling node of the MGC. The MGC may support large numbers (e.g., hundreds or thousands) of MGs and would therefore comprise several signaling nodes for this purpose.

One approach to H.248 signaling using the above signaling connection is for the MGC to select one link to an MG and to send H.248 messages over that link. The H.248 layer, which is a relatively high-level layer, is used to detect any message failures. The MGC has a threshold to which the count of failed messages would be compared, and when that threshold is crossed, the MGC starts using another link to the MG.

One problem with detecting message failures in the H.248 layer is that such detection occurs relatively slowly at the H.248 layer. Furthermore, in some cases the H.248 application at one end or the other, rather than faults on the signaling links, could cause the failures. Since the failure detection mechanism would not be able to distinguish these types of failures from link failures, recovery from them would occur even more slowly.

Other problems also complicate the development of a reliable signaling connection. For instance, the one-to-many relationship of the MGC to the MGs and the nature of H.248 signaling impose unique constraints on the signaling connection. Specifically, since the MGC may support hundreds of MGs, the resources of the MGC should be used as efficiently as possible. Therefore, the management of signaling connections to the MGs should require minimal MGC resources. Furthermore, sending duplicate messages on both links of a signaling connection to provide link redundancy, for example, as in 1+1 protection schemes, is not a viable option since it uses signaling node (SN) resources in the MGC inefficiently. Additionally, since H.248 signaling may be transported over an underlying protocol which is not guaranteed to be reliable, for example, UDP, there is not necessarily an assurance of end-end transmission as there might be with a reliable protocol, such as TCP. However, even a reliable protocol, such as TCP, can do nothing by itself to provide redundancy for reliable communication in the event that the underlying physical link were to fail.

Therefore, an efficient protocol to manage redundant links forming a reliable connection for signaling is needed.

DETAILED DESCRIPTION OF THE INVENTION

According to at least one embodiment of the invention, a protocol for managing redundant signaling links to form a reliable signaling connection is provided. The protocol has an initialization phase, in which the availability of signaling links is determined and an available signaling link is selected and activated, followed by an operational phase in which the activated link is used for sending signaling messages for a higher-level protocol, for example, H.248 signaling messages. During the operational phase both links are monitored for availability using a query and reply technique, for example, Internet Control Message Protocol (ICMP) echo and reply messages. Should either link fail, a status message is sent to the remaining available link along with an activity switchover being performed, as required, depending on whether the failed link was the active link. The higher-level protocol process, for example, an H.248 call control process, running on the media gateway performs management of the links, and the media gateway controller operates as a slave, whereby it need not initiate nor control any of the activities for management of the signaling links, thereby reducing the processing burden placed upon it. However, optionally, a media gateway controller may request a link switchover, which may be used to support link maintenance activities or link congestion avoidance measures.

Embodiments of the present invention may be practiced with systems having asymmetric numbers of one type of device coupled to another type of device. For example, many (quite possibly hundreds or thousands) of MGs may be coupled to one or a small number of MGCs. Thus, embodiments of the invention may be practiced so as to minimize the processing burden placed on a device such as an MGC, thereby allowing maximal scaling of asymmetric numbers of devices coupled to one another. In accordance with at least one embodiment of the invention, responsibility for link management, which may, for example, include verification of link integrity and control of link redundancy is assigned to a more populous type of device (e.g., MGs), which can fulfill this responsibility using a lower-level process (e.g., ICMP echo and reply messages), while responsibility for control of bearer traffic (e.g., multimedia information) among devices of the more populous type of device can be assigned to one or more devices of the less populous type (e.g., MGCs). For example, an MGC may use H.248 signaling to control bearer traffic among multiple MGs. Such bearer traffic may include specific types of information, such as audio traffic, including voice traffic (which may include various grades of traffic, such as telephone-grade, broadcast-grade, high-fidelity grade, etc.), image traffic, such as video or motion-picture traffic and facsimile traffic, and may include multimedia forms of information that may, for example, include combinations of more than one type of information selected from the following types of information: audio, image, telemetry, data, control (including interactive control information), etc. While terms such as call server and call control can be readily understood in the context of signaling for voice telephone calls, the term "call" is not intended to imply limitation to voice traffic or other traffic traditionally carried over telephone lines, but can be understood to refer to a communication session established for the exchange of any type of bearer traffic.

Thus, while one or a relatively few number of devices of the less populous type can be used to control bearer traffic over a large number of devices of the more populous type, the devices of the less populous type do not need to bear the burden of controlling link management between the devices of the less populous type and the devices of the more populous type. Rather, the devices of the more populous type control the link management for links between themselves and their corresponding one or more devices of the less populous type. For the purposes of link management, the devices of the less populous type can simply reply to queries received from the devices of the more populous type without the need to initiate link management operations, wait for responses from other devices, determine the adequacy and/or timeliness of the responses, or determine what action should be taken in the presence or absence of timely responses.

Therefore, at least one embodiment of the invention provides a unique configuration wherein control at different levels is performed by different types of devices in a system comprising asymmetric numbers of these different types of devices. For link management, control is exerted in a many-over-few manner (e.g., many MGs exerting control over few MGCs) according to one or more lower-level process, while, for bearer traffic management, control is exerted in a few-over-many manner (e.g., few MGCs exerting control over many MGs) according to one or more higher-level processes. Thus, one unique attribute of at least one embodiment of the invention is that a device at one end of a signaling links, for example, a MG, is responsible for administrative functions relating to monitoring the status of the signaling links, allowing it provide redundant signaling capability, while a device at another end of the signaling links, for example, a MGC, is responsible for administrative functions relating to a higher level protocol, for example, H.248.

Figure 1:
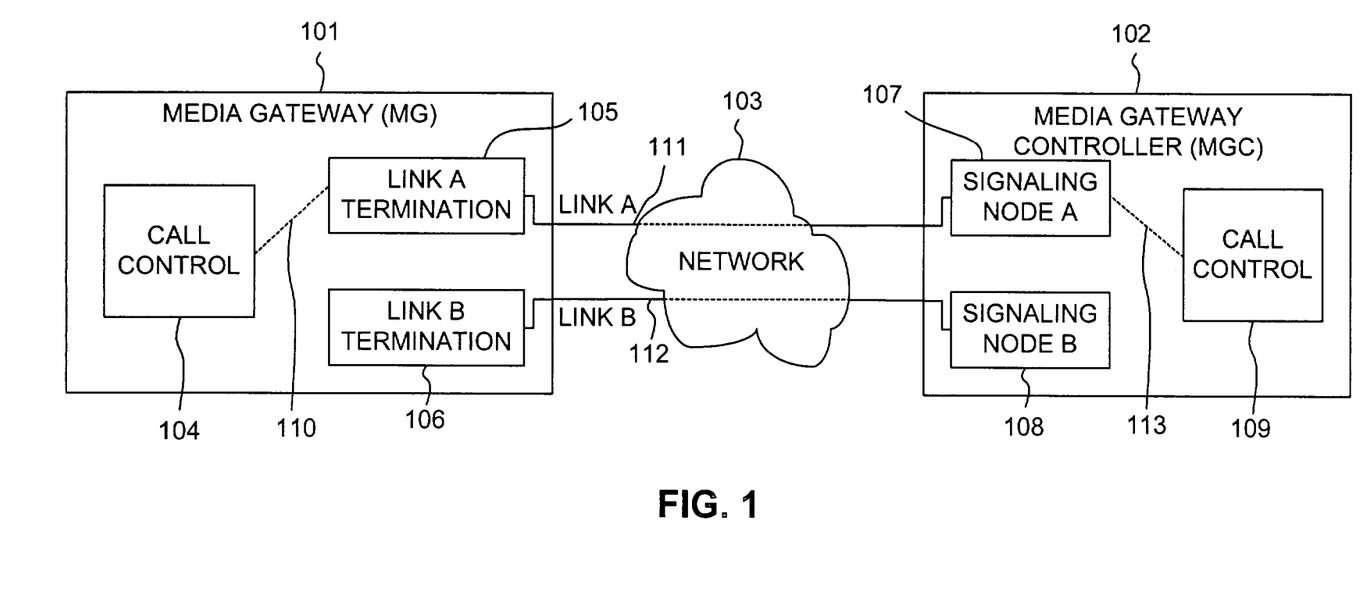
FIG. 1 is a block diagram illustrating a system comprising an MG and a MGC coupled by a network for providing redundant call signaling in accordance with an embodiment of the invention.

FIG. 1 is a block diagram illustrating a system comprising an MG and a MGC coupled by a network for providing redundant call signaling in accordance with an embodiment of the invention. The system comprises a media gateway 101, a media gateway controller 102, and a network 103. Media gateway 101 comprises call control block 104, link A termination 105, and link B termination 106. Media gateway controller 102 comprises signaling node A 107, signaling node B 108, and call control block 109.

In media gateway 101, call control block 104 is selectably coupled to link A termination 105 or link B termination 106 via coupling 110. Link A termination 105 is coupled to signaling node A 107 via link A 111, which passes through network 103. Link B termination 106 is coupled to signaling node B 108 via link B 112, which passes through network 103. In media gateway controller 102, call control block 109 is selectably coupled to signaling node A 107 or signaling node B 108 via coupling 113. Link A 111 and link B 112 are preferably routed over physically diverse paths to minimize the likelihood that some stimulus adversely affecting (e.g., interrupting) communications along either of link A 111 or link B 112 will also adversely affect communications along the other of those links.

Figure 2:
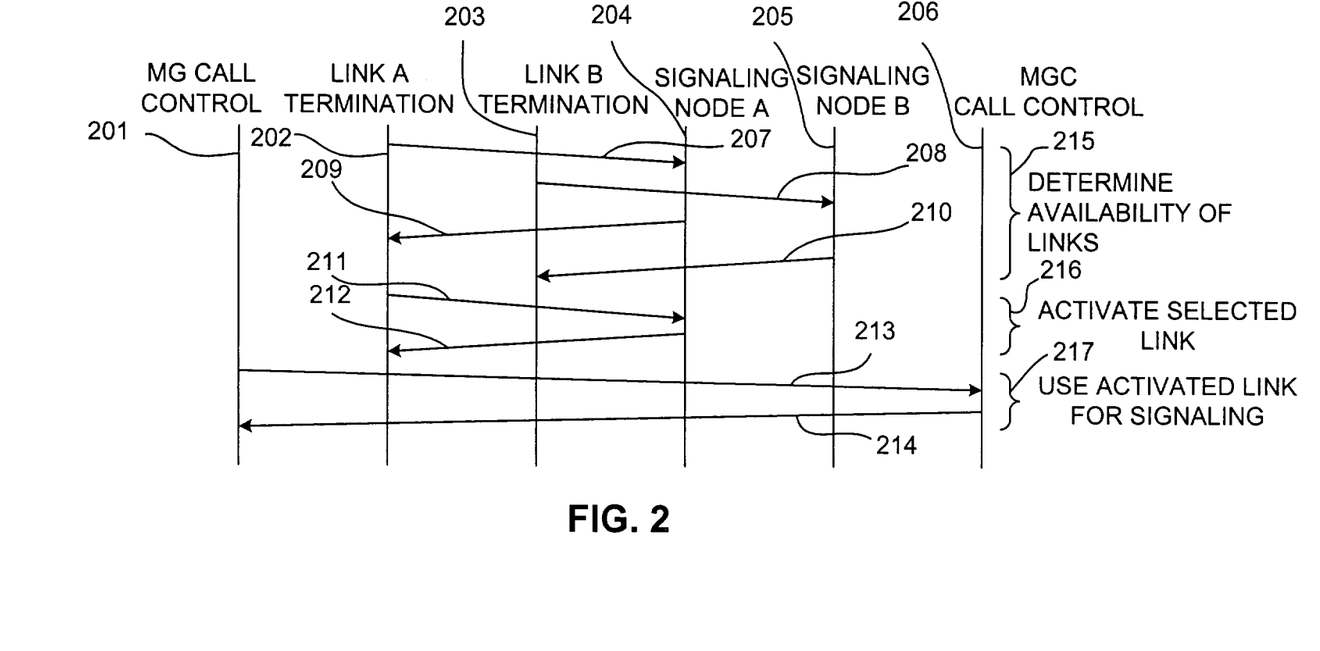
FIG. 2 is a diagram illustrating a method for providing redundant call signaling in accordance with an embodiment of the invention, wherein the method is useful for initialization.

FIG. 2 is a diagram illustrating a method for providing redundant call signaling in accordance with an embodiment of the invention, wherein the method is useful for initialization. In step 207, a query, such as an ICMP echo message, is sent from link A termination 105, which is represented by line 202, to signaling node A 107, which is represented by line 204. In step 208, a query, such as an ICMP echo message, is sent from link B termination 106, which is represented by line 203, to signaling node B 108, which is represented by line 205. Thus, preferably, each link termination of each MG sends a query to its respective signaling node of the MGC, or, if multiple MGCs are provided, to its respective signaling node of each of the MGCs. Preferably, the echo messages are sent with a sequence number and at a predetermined rate.

In step 209, a reply, such as an ICMP reply, is sent from signaling node A 107, which is represented by line 204, to link A termination 105, which is represented by line 202. In step 210, a reply, such as an ICMP reply, is sent from signaling node B 108, which is represented by line 205, to link B termination 106, which is represented by line 203. If a reply matching (e.g., having a sequence number corresponding to) the most recent query or a previous query (which need not be the query immediately preceding the most recent query, but may be an earlier query) is received over a link then the link is deemed available. Next, the first link deemed available is selected for activation. In the illustrated example, link A is selected for activation since the link A termination receives a reply before the link B termination does. In step 211, an activation message, preferably including a sequence number, is sent from link A termination 105, which is represented by line 202, to signaling node A 107, which is represented by line 204, and a timer is started. If an activation acknowledgement message matching (e.g., having a sequence number corresponding to) the activation message is received before the timer expires, then the link has been successfully activated. Otherwise, activation of the link has failed, and another link will be selected for activation if it is available. In step 212, an activation acknowledgement message is sent from signaling node A 107, which is represented by line 204, to link A termination 105, which is represented by line 202.

Upon successful activation of a link, the initialization phase is complete and the link is ready to be used for signaling by a higher-level process (e.g., a call control process in accordance with the H.248 protocol). In step 213, a service change message is sent from media gateway 101, which is represented by line 201, to media gateway controller 103, which is represented by line 206. In step 214, a service change reply is sent from media gateway controller 103, which is represented by line 206, to media gateway 101, which is represented by line 201. In this example, a service change message (preferably, an H.248 service change request) is sent, over Link A, from the call control process at the MG to the call control process at the MGC. Upon granting of the request by the call control process of the MGC, the MG is registered with the MGC, the confirmation of which is sent to the call control process of the MG in the form of a service change reply (preferably, an H.248 service change reply).

Figure 3:
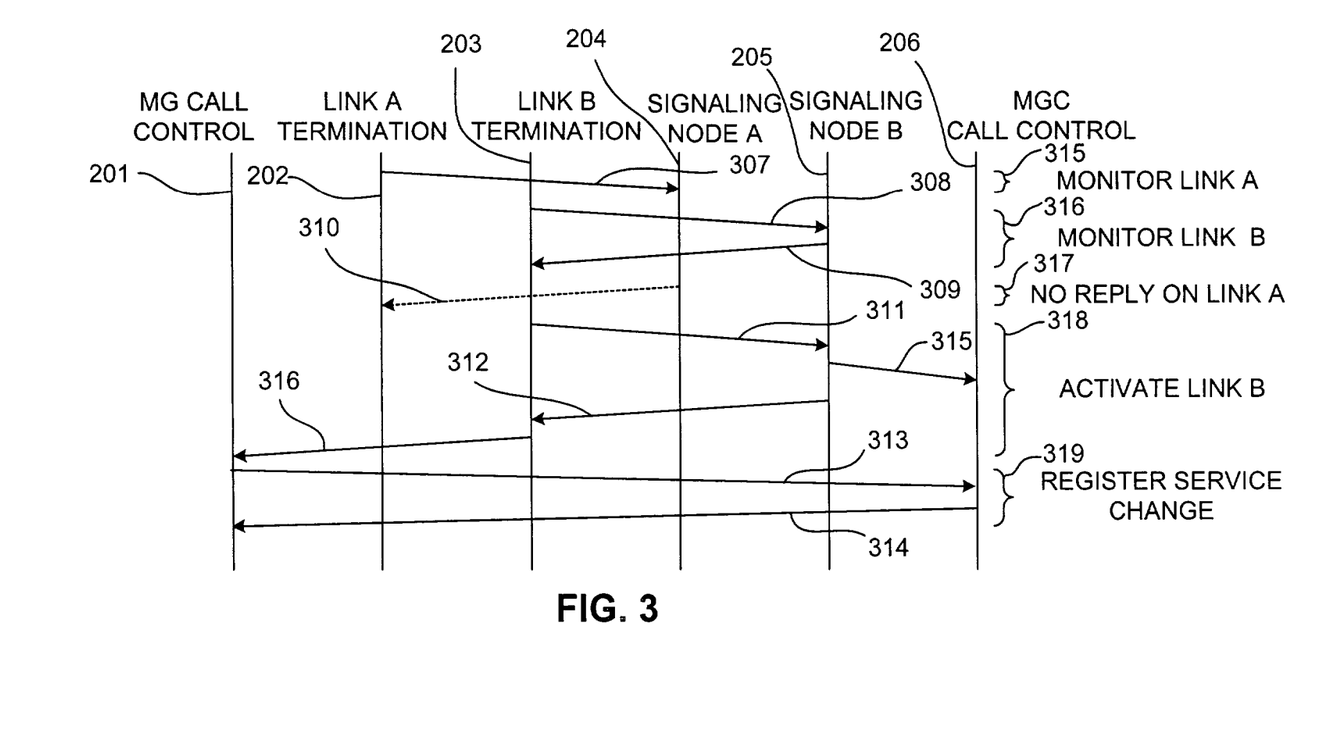
FIG. 3 is a diagram illustrating a method for providing redundant call signaling in accordance with an embodiment of the invention, wherein the method is useful for handling a failure of an active link.
Figure 4:
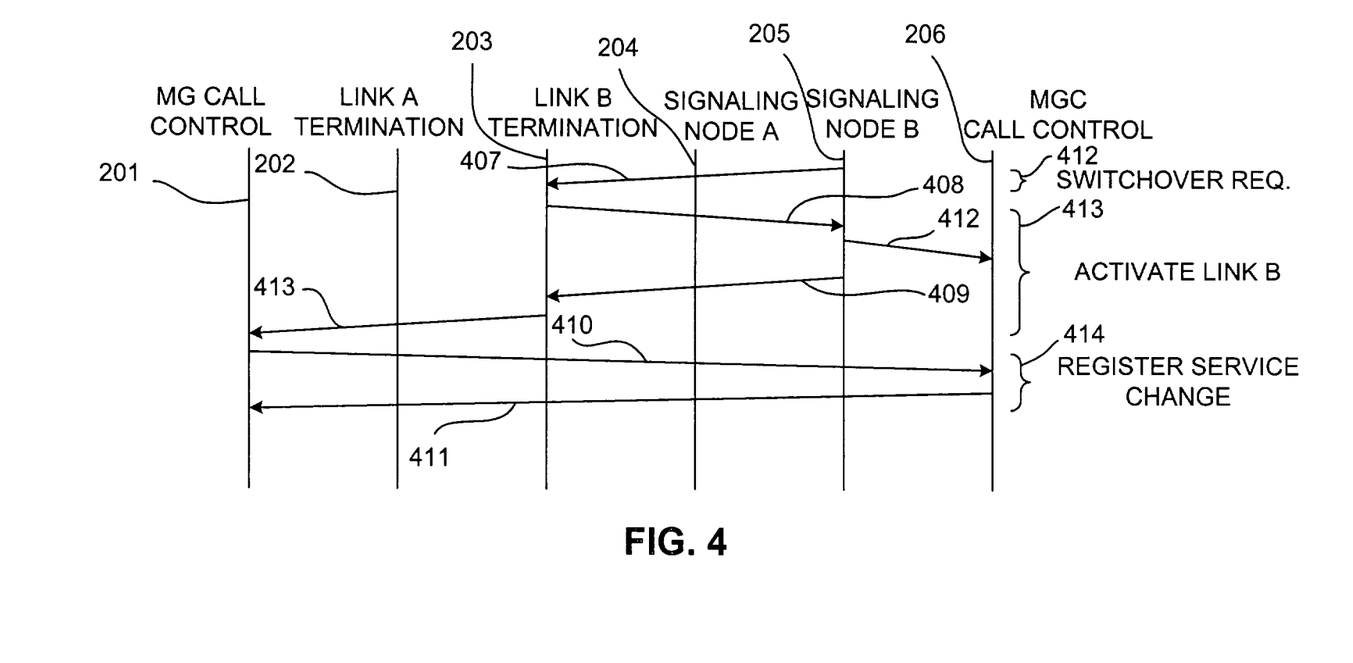
FIG. 4 is a diagram illustrating a method for providing redundant call signaling in accordance with an embodiment of the invention, wherein the method is useful for handling a switchover request.
Figure 5:
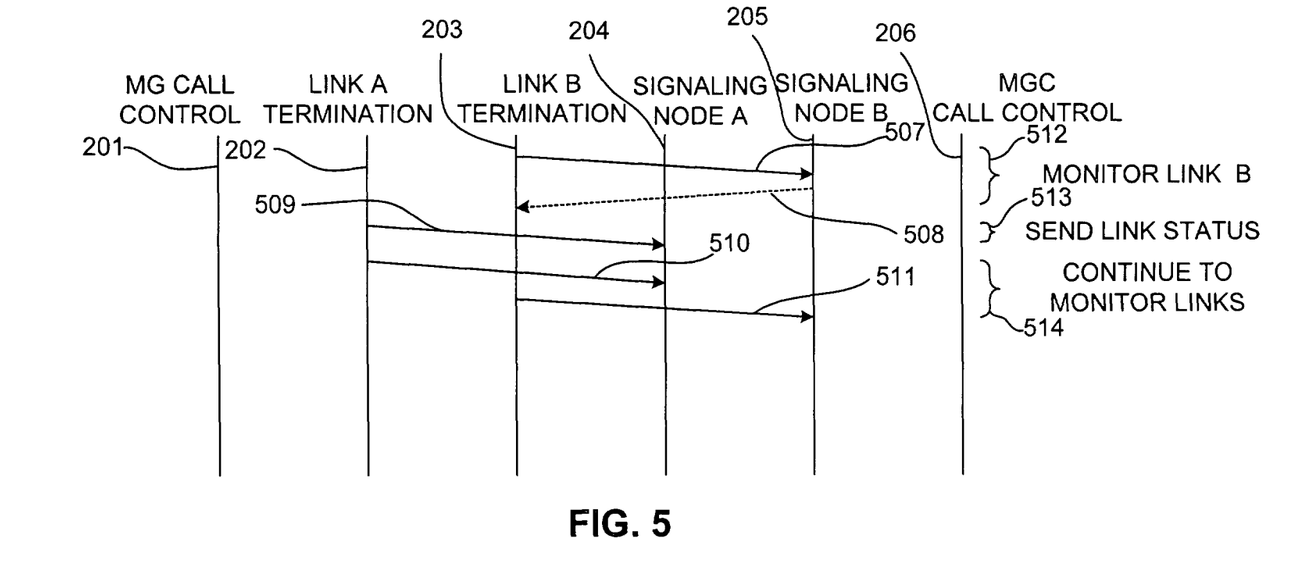
FIG. 5 is a diagram illustrating a method for providing redundant call signaling in accordance with an embodiment of the invention, wherein the method is useful for handling a failure of an inactive link.

Several situations may occur during the operational phase of the links. Methods in accordance with embodiments of the invention are provided to accommodate such situations. FIGS. 3, 4, and 5 illustrate examples of such methods.

FIG. 3 is a diagram illustrating a method for providing redundant call signaling in accordance with an embodiment of the invention, wherein the method is useful for handling a failure of an active link. In step 307, a query, such as an ICMP echo message, is sent from link A termination 105, which is represented by line 202, to signaling node A 107, which is represented by line 204. In step 308, a query, such as an ICMP echo message, is sent from link B termination 106, which is represented by line 203, to signaling node B 108, which is represented by line 205.

In step 309, a reply, such as an ICMP reply, is sent from signaling node B 108, which is represented by line 205, to link B termination 106, which is represented by line 203. In step 310, while link A termination 105 awaits a reply, such as an ICMP reply, from signaling node A 107, which is represented by line 204, such a reply is not received at link A termination 105 within a reasonable time. Thus, link A 111 is determined to be faulty.

In step 311, an activation message is sent from link B termination 106, which is represented by line 203, to signaling node B 108, which is represented by line 205. In step 315, routing tables for MGC 102 are updated, which may, for example, effectively result in coupling 113 being moved so as to couple signaling node B 108 to call control block 109. In step 312, an activation acknowledgement message is sent from signaling node B 108, which is represented by line 205, to link B termination 106, which is represented by line 203. In step 316, routing tables for MG 101 are updated, which may, for example, effectively result in coupling 110 being moved so as to couple link B termination 106 to call control block 104.

In step 313, a service change message is sent from media gateway 101, which is represented by line 201, to media gateway controller 103, which is represented by line 206. In step 314, a service change reply is sent from media gateway controller 103, which is represented by line 206, to media gateway 101, which is represented by line 201.

Thus, a failure on the active link (in this example, link A) is detected when a reply to a query is not received in a timely manner. That is, either no reply is received, or no reply matching (e.g., corresponding to the sequence number of) either the most recent query or a previous query (which need not be the query immediately preceding the most recent query, but may be an earlier query) is received. When this condition occurs, activity is switched to another link, which may be referred to as a standby link (in this example, link B), which is understood to be available according to the ongoing monitoring of the standby link via query and reply messages (e.g., ICMP echo and reply messages). An exchange of activation and activation acknowledgement messages between the link B termination 106 and the signaling node B 108 is used to activate the link. The newly active link, link B, is now ready to carry higher-level process messages (e.g., H.248 signaling messages), which may, for example, begin with a service change request to the media gateway controller.

FIG. 4 is a diagram illustrating a method for providing redundant call signaling in accordance with an embodiment of the invention, wherein the method is useful for handling a switchover request. For example, a switchover from the active link (e.g., link A) to a standby link (e.g., link B) may be initiated by a switchover request from the media gateway controller. The switchover request is preferably sent over the standby link (e.g., link B). By sending the switchover request over the standby link, an additional opportunity is provided to verify that the standby link is ready for communication. In step 407, a switchover request is sent from signaling node B 108, which is represented by line 205, to link B termination 106, which is represented by line 203. The switchover request is acknowledged and acted upon by an activation message sent from the link B termination 106 to signaling node B 108 over link B 112. In step 408, an activation message is sent from link B termination 106, which is represented by line 203, to signaling node B 108, which is represented by line 205. Activation of the link is confirmed by an activation acknowledgement message from the signaling node B 108 to the link B termination 106 preferably over the same link B 112. In step 412, routing tables for MGC 102 are updated, which may, for example, effectively result in coupling 113 being moved so as to couple signaling node B 108 to call control block 109. In step 409, an activation acknowledgement message is sent from signaling node B 108, which is represented by line 205, to link B termination 106, which is represented by line 203. In step 413, routing tables for MG 101 are updated, which may, for example, effectively result in coupling 110 being moved so as to couple link B termination 106 to call control block 104.

At this point, the steps of the lower-level process for processing the switchover request have been completed, and the link is ready to carry higher-level process communications, for example, H.248 signaling messages, which preferably begin with an H.248 service change request and reply exchange between the call control processes in the media gateway and the media gateway controller. In step 410, a service change message is sent from media gateway 101, which is represented by line 201, to media gateway controller 103, which is represented by line 206. In step 411, a service change reply is sent from media gateway controller 103, which is represented by line 206, to media gateway 101, which is represented by line 201.

FIG. 5 is a diagram illustrating a method for providing redundant call signaling in accordance with an embodiment of the invention, wherein the method is useful for handling a failure of an inactive link. In step 507, a query, such as an ICMP echo request, is sent from link B termination 106, which is represented by line 203, to signaling node B 108, which is represented by line 205. In step 508, while link B termination 106 awaits a reply, such as an ICMP reply, it does not receive such a reply from link B termination 106 within a reasonable amount of time. In step 509, link A termination 105, which is represented by line 202, sends a status message to signaling node A 107, which is represented by line 204, indicating that link B is faulty. In step 510, link A termination 105 sends a query, such as an ICMP echo request, to signaling node A 107. In step 511, link B termination 106 sends a query, such as an ICMP echo request, to signaling node B 108.

When, a some later point in time, link B termination 106 receives a valid reply from signaling node B 108, link A termination 105 can send a status message to signaling node A 107 (or link B termination 106 can send a status message to signaling node B 108) to update the link status information and to indicate that link B is available for communication.

MONITOR LINK B 512 comprises steps 507 and 508. SEND LINK STATUS 513 comprises step 509. CONTINUE TO MONITOR LINKS 514 comprises steps 510 and 511.

Thus, at least one embodiment of the invention provides the ability to send a status message over the active link (e.g. link A) when the monitoring of the standby link (e.g. link B) detects that the standby link is no longer available. This condition can be detected in a manner described previously with reference FIG. 3, such as when the link termination in the media gateway fails to receives a correct and timely reply to a query sent over its associated link. Monitoring of both links continues after the status message has been sent, and further status messages can be issued in accordance with the results of the monitoring. For example, if a standby link were to come available again at a later time, a status message indicating the renewed availability of the standby link could then be sent.

While several examples have been described in the context of two links (e.g., link A and link B), it should be understood that any number of links between a device of a more populous type and a device of a less populous type may be provided to further enhance redundancy. Regardless of the number of such links implemented, such links may be considered as a single signaling connection by a higher-level process. No more than one such link need be active at any time, thereby providing efficient use of signaling bandwidth available between the devices.

At least one embodiment of the invention minimizes overhead (both in terms of processing burden and communications bandwidth) used to provide link management capability for redundant signaling links. Much of the overhead can be limited to the initialization phase, with very minimal resources needed to perform continued monitoring of the links over time. Thus, redundant signaling links can be efficiently provided and utilized.

In accordance with one or more embodiments of the invention, MGs continue to send periodic queries to continue to monitor status of connections. For example, MGs set timers for each MGC and send queries when the timers elapse. If MGC had to perform these administrative functions, it would have to set timers for hundreds or thousands of MGs. The MGs are responsible for the administrative functions relating to monitoring the status of the signaling links. These functions include determining which MGCs to query, when to query them, over which signaling links to those MGCs the queries should be sent, how long to wait for a reply from the MGCs, what action is to be taken if a reply is or is not received within the designated period for the reply.

One or more embodiments of the invention may be used to communicate other signaling protocols over redundant links. For example, signaling protocols such as tone signaling, (integrated service digital network) ISDN, global system for mobile communications (GSM), or (signaling system #7) SS7 or successors thereto may be communicated. As an example of one context in which communication of signaling information of different signaling protocols is useful is signaling transport, which may be referred to as SigTran. For signaling transport of an ISDN D-channel, a MG can send ISDN D-channel signaling information to a MGC over a signaling link, and the MGC can send H.248 signaling information corresponding to ISDN B-channels over the signaling link, or in the event the signaling link is unavailable, over a second signaling link provided for redundancy.

Bearer traffic is preferably communicated over ATM connections (e.g., voice connections are preferably communicated as voice over ATM), while signaling messages are preferably communicated preferably H.248 over ATM or alternatively as H.248 over IP over ATM. Thus, one or more embodiments of the invention are able to provide greater efficiency for the communication of bearer traffic by communicating it over circuit-switched connections, while providing the flexibility to communicate signaling information over either circuit-switched connections or as packet-switched traffic over circuit-switched connections.

Technologies such as voice over IP (VoIP) and Voice over ATM are likely to become more prevalent as service providers move to converged networks. In accordance with one or more embodiments of the invention, the H.248 signaling protocol can be used to control call setup in such networks. The invention may be practiced so as to enable reliable H.248 signaling, the reliability of which will be a critical need for carrier-grade VoIP and Voice over ATM services.

While it would be possible to provide signaling links using protocols that provide some abilities to detect and accommodate link faults, such as IP or ATM SPVCs, reliance on such abilities can lead to slower response to link faults, allowing more disruption of communications over a longer period of time. Moreover, implementations of protocols that provide such abilities typically involve additional cost and complexity. Therefore, while embodiments of the present invention may be practiced in conjunction with such protocols, the ability of embodiments of the present invention to provide faster response to link faults and, consequently, less disruption of communications, as well as to avoid the need for additional cost and complexity, allows such embodiments to provide superior performance.

Accordingly, a method and apparatus for redundant call signaling has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method comprising the steps of:
    initializing a plurality of links between a media gateway and a media gateway controller;
    activating a first link of the plurality of links;
    registering the first link for communication of call control signaling information by a higher level process running on the media gateway, wherein the higher level process performs management of the links, while the media gateway controller operates as a slave to the media gateway;
    monitoring the first link by transmitting an internet control message protocol (ICMP) echo request over the first link and over a second link;
    waiting for an ICMP reply message within a predetermined period of time on each of the first and second links; and
    when no reply message is received on the first link, transmitting a status message on the second link to indicate a fault on the first link.

2. The method of claim 1 wherein the step of initializing further comprises the step of:
  determining whether each of the plurality of links is available for use.

3. The method of claim 1 wherein the higher level process is an H.248 process.

4. The method of claim 1 wherein the step of activating the first link of the plurality of links further comprises the steps of:
  transmitting a link activation message for the first link; and
  receiving a link activation acknowledgement message for the first link.

5. The method of claim 4 wherein the step of registering the first link for communication of call control signaling information by a higher level process further comprises the steps of:
  transmitting a service change message; and
  receiving a service change reply message.

6. The method of claim 5 wherein the service change message and the service change reply message are H.248 messages transported as user datagram protocol (UDP) packets over internet protocol (IP) over asynchronous transfer mode (ATM) links.

7. The method of claim 4 wherein the step of transmitting the link activation message for the first link involves the media gateway transmitting the link activation message to the media gateway controller.

8. The method of claim 7 wherein, for the communication of the call control signaling information, the media gateway controller exerts control over the media gateway.

9. The method of claim 8 wherein the call control signaling information conforms to Recommendation H.248.

10. The method of claim 8 wherein, for the communication of the call control signaling information, the media gateway controller further exerts control over a second media gateway coupled to the media gateway controller by a second plurality of links.

11. The method of claim 1 further comprising the step of: selecting the first link for use.

12. The method of claim 11 wherein the first link is selected based upon a response time on the first link relative to response times on other links of the plurality of links.

13. The method of claim 12 wherein the first link is selected based on having an earliest response among the plurality of links.

14. The method of claim 1 wherein registering the first link for communication of call control signaling information by a higher level process further comprises:
  registering the first link such that the higher level process considers the plurality of links to be a single signaling connection.

15. The method of claim 1 further comprising:
  a more populous plurality of media gateways; and
  a less populous plurality of media gateway controllers, wherein, for link management, the more populous plurality of media gateways exert control over the less populous plurality of media gateway controllers according to a lower-level process, and, for bearer traffic management, the less populous plurality of media gateway controllers exert control over the more populous plurality of media gateways according to the higher-level process.

16. A method comprising the steps of:
  monitoring a plurality of links between a media gateway and a media gateway controller;
  monitoring a first link of the plurality of the links by transmitting an internet control message protocol (ICMP) echo request over the first link and over a second link;
  waiting for an ICMP reply message within a predetermined period of time on each of the first and second links;
  determining a failure affecting the first link;
  when no reply message is received on the first link, transmitting a status message on the second link to indicate a fault on the first link;
  activating the second link of the plurality of the links; and
  registering the second link for communication of call control signaling information by a higher level process.

17. The method of claim 16 further comprising the step of: updating routing tables to allow utilization of the second link.

18. The method of claim 16 wherein the higher level process is an H.248 process.

19. The method of claim 16 wherein the step of activating the second link of the plurality of links further comprises the steps of:
  transmitting a link activation message for the second link; and
  receiving a link activation acknowledgement message for the second link.

20. The method of claim 19 wherein the step of registering the second link for communication of call control signaling information by a higher level process further comprises the steps of:
  transmitting a service change message; and
  receiving a service change reply message.

21. The method of claim 20 wherein the service change message and the service change reply message are H.248 messages transported as user datagram protocol (UDP) packets over internet protocol (IP) over asynchronous transfer mode (ATM) links.

22. The method of claim 19 wherein the step of transmitting a link activation message for the second link involves the media gateway transmitting the link activation message to the media gateway controller.

23. The method of claim 22 wherein, for the communication of the call control signaling information, the media gateway controller exerts control over the media gateway.

24. The method of claim 23 wherein the call control signaling information conforms to Recommendation H.248.

25. The method of claim 23 wherein, for the communication of the call control signaling information, the media gateway controller further exerts control over a second media gateway coupled to the media gateway controller by a second plurality of links.

26. A method comprising the steps of:
  establishing communication between a media gateway and a media gateway controller over a first link of a plurality of links;
  receiving at the media gateway a switchover request from the media gateway controller;
  monitoring the first link by transmitting an internet control message protocol (ICMP) echo request over the first link and over a second link;
  waiting for an ICMP reply message within a predetermined period of time on each of the first and second links;
  when no reply message is received on the first link, transmitting a status message on the second link to indicate a fault on the first link;
  activating the second link of the plurality of links; and
  registering the second link for communication of call control signaling information by a higher level process.

27. The method of claim 26 wherein the step of activating the second link of the plurality of links further comprises the steps of:
transmitting a link activation message for the second link; and
receiving a link activation acknowledgement message for the second link.

28. The method of claim 27 wherein the step of registering the second link for communication of call control signaling information by a higher level process further comprises the steps of:
transmitting a service change message; and
receiving a service change reply message.

29. The method of claim 28 wherein the service change message and the service change reply message are H.248 messages transported as user datagram protocol (UDP) packets over internet protocol (IP) over asynchronous transfer mode (ATM) links.

30. The method of claim 27 wherein the step of transmitting the link activation message for the second link involves the media gateway transmitting the link activation message to the media gateway controller.

31. The method of claim 30 wherein, for the communication of the call control signaling information, the media gateway controller exerts control over the media gateway.

32. The method of claim 31 wherein the call control signaling information conforms to Recommendation H.248.

33. The method of claim 31 wherein, for the communication of the call control signaling information, the media gateway controller further exerts control over a second media gateway coupled to the media gateway controller by a second plurality of links.

34. A method comprising the steps of:
establishing communication between a media gateway and a media gateway controller over a first link of a plurality of links during an initialization phase;
monitoring the plurality of links between a media gateway and a media gateway controller during an operational phase including monitoring the first link by transmitting an internet control message protocol (ICMP) echo request over the first link and over a second link;
waiting for an ICMP reply message within a predetermined period of time on each of the first and second links;
when no reply message is received on the first link, transmitting a status message on the second link to indicate a fault on the first link;
determining a failure affecting the second link of the plurality of the links; and
transmitting a link status message regarding the failure affecting the second link from the media gateway to the media gateway controller.

35. The method of claim 34 further comprising:
sending H.248 signaling messages over the first link during the operational phase.

36. The method of claim 34 wherein, for the communication of call control signaling information during the operational phase, the media gateway controller exerts control over the media gateway.

37. The method of claim 36 wherein the call control signaling information conforms to Recommendation H.248.

38. The method of claim 36 wherein, for the communication of the call control signaling information during the operational phase, the media gateway controller further exerts control over a second media gateway coupled to the media gateway controller by a second plurality of links.

* * * * *